United States Patent [19]

Onoda et al.

[11] Patent Number: 5,661,636
[45] Date of Patent: Aug. 26, 1997

[54] IC CARD WITH ON-BOARD HARD DISK AND CIRCUIT BOARD WITH ON-BOARD HARD DISK INCLUDING A COVER WITH A BULGING PORTION ACCOMMODATING THE HARD DISK

[75] Inventors: Shigeo Onoda; Jun Ohbuchi; Makoto Omori, all of Itami; Takeshi Uenaka; Tomomi Morii, both of Sanda, all of Japan

[73] Assignee: Mitsubishi Denki Kabushiki Kaisha, Tokyo, Japan

[21] Appl. No.: 542,165

[22] Filed: Oct. 12, 1995

[30] Foreign Application Priority Data

Oct. 25, 1994 [JP] Japan ................................ 6-260487

[51] Int. Cl.$^6$ ........................ G06F 1/16; H05K 7/10
[52] U.S. Cl. ................................................ 361/685
[58] Field of Search ........................ 361/684, 685, 361/737; 364/708.1; 439/928.1, 946; 360/97.01, 137, 900; 369/75.1

[56] References Cited

U.S. PATENT DOCUMENTS 5,243,495  9/1993  Read et al. ........................ 361/685

*Primary Examiner*—Michael W. Phillips
*Attorney, Agent, or Firm*—Leydig, Voit & Mayer

[57] ABSTRACT

An IC card with an on-board hard disk unit comprising a frame; a circuit board inside the frame; and a hard disk unit mounted on the circuit board. The IC card also has a metal front panel supported by the frame, and covering the entire IC card, including the hard disk unit. Thus, the outer surface of the IC card is made stronger, and the hard disk is protected from static electricity. The metal front panel includes a first portion where the IC card is relatively thin and a second, bulging portion where the IC card is relatively thick. The bulging portion accommodates the hard disk unit. The front panel may include a vent or mesh.

5 Claims, 3 Drawing Sheets

IC CARD WITH ON-BOARD HARD DISK AND CIRCUIT BOARD WITH ON-BOARD HARD DISK INCLUDING A COVER WITH A BULGING PORTION ACCOMMODATING THE HARD DISK

BACKGROUND OF THE INVENTION

Field of the Invention

The present invention relates to an IC Card with an on-board hard disk and a circuit board with an on-board hard disk.

FIG. 11 is a full oblique view of a prior art IC card with on-board hard disk, and FIG. 12 is a cross-section view of section 12—12 of FIG. 11 showing the internal structure of the prior art IC card. A hard disk unit 1 having an outer cover comprising a material such as aluminum, a battery 2, and an integrated circuit device 3, are each placed on a circuit board 4, and attached thereto by soldering or some other method. Also, a connector 5 is mounted at one edge of circuit board 4, by soldering, to provide connections to external equipment (not shown). The unit comprising these interconnected components is referred to as module 6. This module 6 is arranged within a frame 7, and is fixed to the sides thereof by double-sided tape, or the like. Also, on the side of the IC card opposite that on which hard disk unit 1 is mounted, is a rear panel 8 covering the entire rear surface, which is fastened at its perimeter to the frame 7 by an adhesive sheet (not shown) or screw fasteners, etc. (not shown).

In such prior art IC cards with an on-board hard disk unit 1, because the hard disk unit 1 protrudes from frame 7 in the thickness direction, no front panel can be provided on the side on which the hard disk unit 1 is mounted. Because of this, there are problems in that the hard disk unit 1 was not protected from externally-applied mechanical force, and could be easily damaged. There was also a problem in that the hard disk unit 1 was prone to data errors when subjected to static electricity.

SUMMARY OF THE INVENTION

It is the object of the present invention to solve the above problems by providing an IC card with an on-board hard disk that is both electrostatic-resistant and has a strong exterior cover that protects it against externally-applied mechanical force.

The foregoing object is achieved according to one aspect of the present invention through the provision of an IC card with an on-board hard disk comprising a frame, a circuit board arranged within and supported by the frame and having a hard disk unit mounted thereon, and a metal front panel supported by the frame and covering the entire IC card, including the hard disk unit. Accordingly, the outer surface of the IC card is made stronger, and the hard disk unit is protected from static electricity.

In the IC card with an on-board hard disk, the front panel may have at least one vent provided therein. Air circulates between the inside and outside of the IC card assembly. Thus, a rise in temperature inside the IC card is prevented.

In the IC card with an on-board hard disk, the front panel may be a mesh-type front panel. The ability of the IC card to allow air to pass through itself is thereby improved. Thus, the rise in temperature inside the IC card is prevented.

In the IC card with on-board hard disk, a metal plate may be attached to part of the surface of the hard disk unit. The metal plate dissipates heat generated by the hard disk unit. The rise in temperature inside the IC card is thereby prevented. The plate also protects the hard disk from externally-applied mechanical force.

In the IC card with an on-board hard disk, the hard disk unit may be attached to the circuit board through a resilient body sandwiched between the hard disk unit and the circuit board. The resilient body absorbs the vibrations of the hard disk unit. Thus, the reliability of data stored on the hard disk unit is improved.

The foregoing object is achieved according to another aspect of the present invention through the provision of a circuit board with an on-board hard disk comprising a hard disk unit, a generally rectangular circuit board with the hard disk unit mounted thereon, and a metal plate attached to a portion of the surface of the hard disk unit. The metal plate dissipates heat generated by the hard disk unit. Thus, the rise in temperature of the hard disk unit is prevented. The plate also protects the hard disk unit from externally-applied mechanical force.

In the circuit board with an on-board hard disk, a resilient body may be provided between the hard disk unit and the circuit board, for supporting the hard disk unit. Since the metal plate dissipates heat generated by the hard disk unit, the rise of hard disk unit temperature is prevented. The plate also protects the hard disk unit from externally-applied mechanical force. In addition, the resilient body absorbs the vibrations of the hard disk unit. Thus, the reliability of the data stored by the hard disk unit is improved.

The foregoing object is achieved according to still another aspect of the present invention through the provision of a circuit board with an on-board hard disk comprising a hard disk unit, the generally rectangular circuit board with a hard disk unit mounted thereon, and a resilient body sandwiched between the hard disk unit and the circuit board for supporting the hard disk unit. The resilient body absorbs the vibrations of the hard disk unit. Thus, the reliability of the data stored by the hard disk unit is improved.

DESCRIPTION OF THE PREFERRED EMBODIMENTS

First Embodiment

Figure 1:
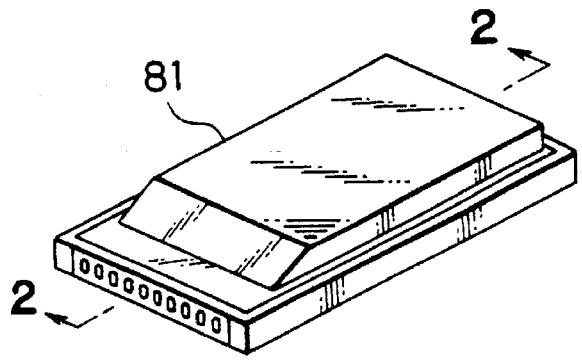
FIG. 1 is a full oblique view showing the IC card with on-board hard disk unit of this invention.
Figure 2:
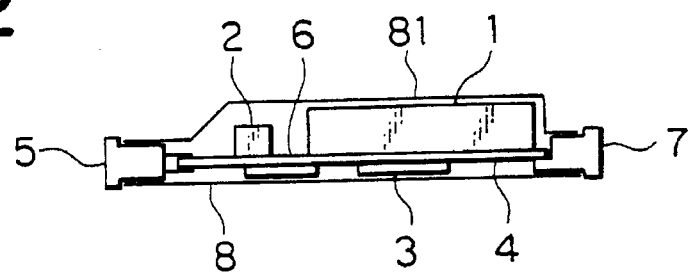
FIG. 2 is a cross-section view of section 2—2 of FIG. 1 showing the internal structure of the IC card.

FIG. 1 is a full oblique view of the IC card of the present invention, and FIG. 2 is a cross-sectional view of section 2—2 of FIG. 1 showing the internal structure of the IC card. In these figures, items 1 through 8 are the same as described for the prior art IC card, and are therefore not discussed here. Provided on the side on which the hard disk unit 1 is mounted is a metal front panel 81, which bulges in the upward direction (as it appears in the drawing), and which covers the entire IC card assembly, including the hard disk unit 1, connector 5, etc. This front panel 81, which makes absolutely no contact with the hard disk unit 1, covers the hard disk unit 1, and is attached at its periphery to frame 7 and connector 5 by an adhesive sheet (not shown), or screw fasteners, etc. (not shown).

Because the front panel 81 covers one entire side of the IC card (the side on which the hard disk unit is mounted) in this manner, the IC card comprises a sturdy exterior in a simple structure. Also, since front panel 81 is formed so as to make absolutely no contact with the hard disk unit 1, if front panel 81 of the IC card is subjected to static electricity from the outside, the charge escapes through panel 81 to the connected system (not shown) without causing errors in data stored by the hard disk unit 1.

Second Embodiment

Figure 3:
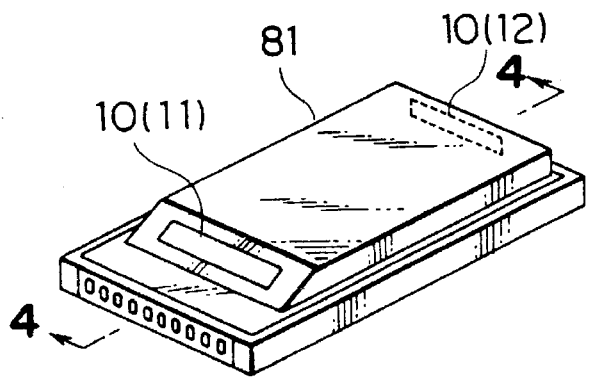
FIG. 3 is a full oblique view of the IC card of another embodiment of this invention.
Figure 4:
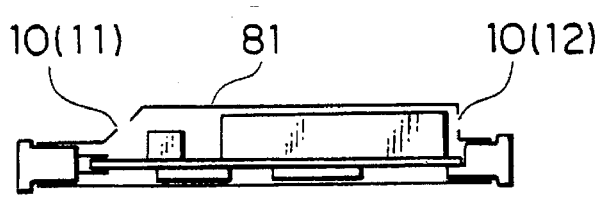
FIG. 4 is a cross-section view of section 4—4 of FIG. 3 showing the internal structure of the IC card of another embodiment of this invention.

FIG. 3 is a full oblique view of the IC card in accordance with a second embodiment of the present invention, and FIG. 4 is a cross-sectional view of section 4—4 of FIG. 3 showing the internal structure of the IC card. As shown in the figures, vents 10 are provided in a portion of the front panel 81 for passing air between the inside and the outside of the IC card. The vents 10 are provided in at least two locations to serve as an intake vent 11 and an exhaust vent 12.

In this manner, rising temperatures from heat generated by the hard disk unit 1 can be suppressed by providing vents 10 in the panel 81 on the hard disk side of the IC card. Furthermore, smooth flow of air can be effected by placing the intake vent 11 and exhaust vent 12 at different heights and locations. The roles of the air supply and exhaust vents may be reversed, depending on the way the IC card is installed.

Third Embodiment

Figure 5:
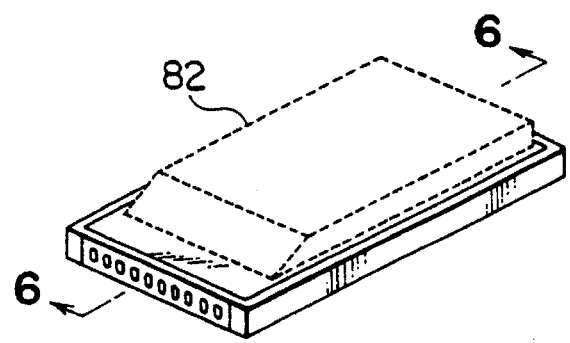
FIG. 5 is a full oblique view of the IC card of another embodiment of this invention.
Figure 6:
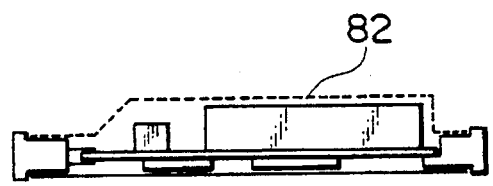
FIG. 6 is a cross-section view of section 6—6 of FIG. 5 showing the internal structure of the IC card of another embodiment of this invention.

FIG. 5 is a full oblique view of the IC card the accordance with the third embodiment of the present invention, and FIG. 6 is a cross-section view of section 5—5 of FIG. 5 showing the internal structure of the IC card. As can be seen in these figures, the front panel 82 is a mesh-type metal panel, and the other elements of the structure are the same as in the first embodiment. That is, the front panel 82, which covers the entire top of the assembly, including connector 5, is attached at its periphery to frame 7 with an adhesive sheet (not shown), or screw fasteners, etc. (not shown), making absolutely no contact with hard disk unit 1.

Because the metal mesh panel 82 covers the entire hard disk side of the IC card in this manner, the ability of the IC card to pass air through itself is good. This acts to suppress rising temperature due to heat generated by hard disk unit 1. In addition, metal mesh panel 82 protects components mounted on the IC card (such as hard disk unit 1) from externally-applied mechanical force, etc. Also, the metal mesh front panel 82 is just as effective as non-mesh metal front panels with respect to static electricity protection.

Fourth Embodiment

Figure 7:
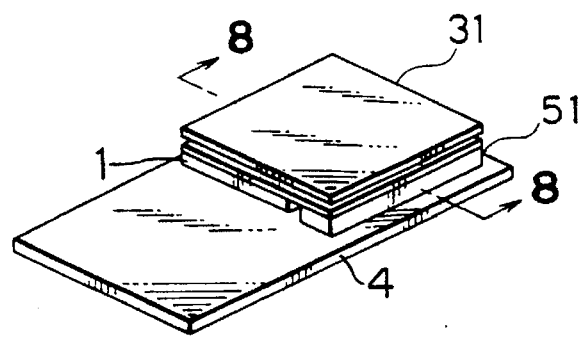
FIG. 7 is an oblique view showing the hard disk installation in another embodiment of this invention.
Figure 8:
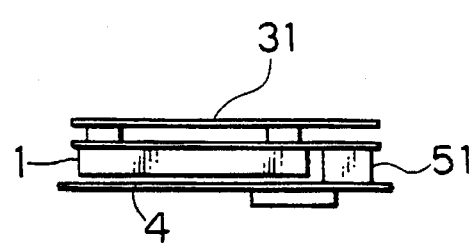
FIG. 8 is a cross-section view of section 8—8 of FIG. 7 showing hard disk unit installation details of another embodiment of this invention.

FIG. 7 is an oblique view showing the installation of hard disk unit 1 in accordance with a fourth embodiment of this invention, and FIG. 8 is a cross-section view of section 8—8 of FIG. 7 showing installation details. As shown in these figures, the hard disk unit 1 is fixed in cantilever fashion through junction connector 51 to circuit board 4. Attached to the side of hard disk unit 1 that is opposite the side on which the connector 51 is installed, is a metal plate 31 made of a metal such as aluminum. This metal plate 31 is attached to the hard disk 1 by screws screwed into protrusions that have screw holes in them (the protrusions having been provided on the hard disk unit 1 beforehand), such that the plate itself does not touch the hard disk 1.

Because the metal plate 31 is attached to the hard disk unit 1 in this manner, heat generated by hard disk unit 1 is conducted through the attaching parts to metal plate 31, and is also transferred to metal plate 31 by direct radiation. Metal plate 31 further transfers heat to the metal front panel, such that the assembly as a whole effectively suppresses rising temperatures in the hard disk unit.

Also, even should front panel 81 covering hard disk unit 1 be distorted by external force applied to it, this force will be taken up by metal plate 31. Since the force is not applied to hard disk unit 1 itself, the IC card is thereby rendered better able to withstand external force.

This embodiment relates to a circuit board 4 inside an IC card, and a hard disk unit 1 mounted thereon. The beneficial effects, however, need not be confined to applications having a circuit board 4 in an IC card, but should be generally applicable to any hard disk unit mounted on any circuit board.

Fifth Embodiment

Figure 9:
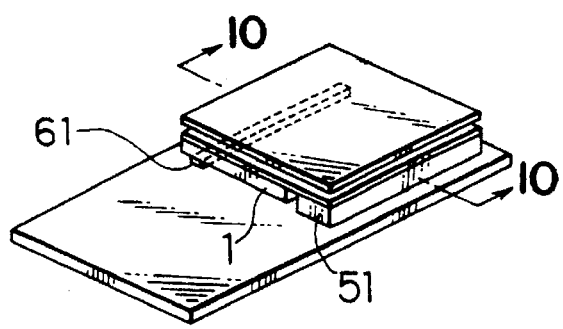
FIG. 9 is an oblique view showing the hard disk installation in another embodiment of this invention.
Figure 10:
FIG. 10 is a cross-section view of section 10—10 of FIG. 9 showing hard disk unit installation details of another embodiment of this invention.
Figure 11:
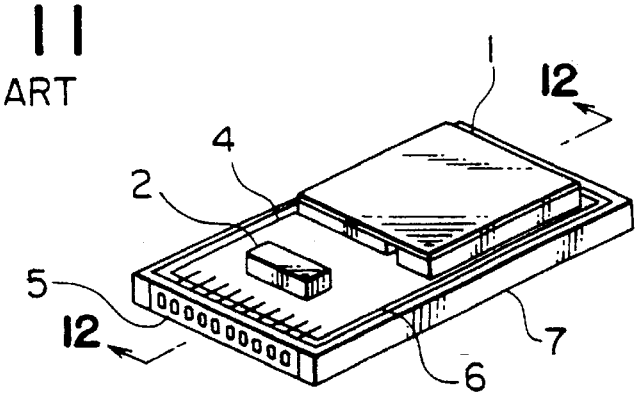
FIG. 11 is a full oblique view of an prior IC card with on-board hard disk.
Figure 12:
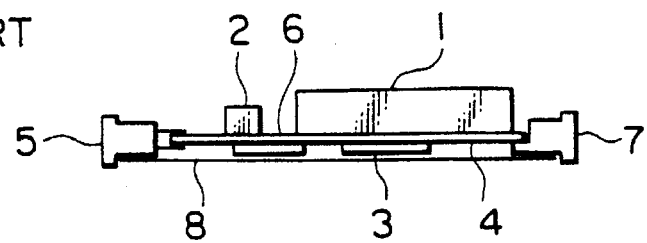
FIG. 12 is a cross-section view of section 12—12 of FIG. 11 showing the internal structure of the prior IC card.

FIG. 9 is an oblique view showing the hard disk installation in accordance with a fifth embodiment of this invention, and FIG. 10 is a cross-section view of section 10—10 of FIG. 9 showing installation details. As shown in these figures, the hard disk unit 1 is supported at one end by junction connector 51 and at the other end by anti-vibration rubber pad 61 (a resilient body).

Because the hard disk unit 1 is supported in this manner by the anti-vibration rubber pad 61 at the end opposite that at which junction connector 51 is attached, the mechanical load on the hard disk 1 is distributed across the unit, and the load on the junction connector 51 is reduced, thus improving the reliability of the connections. Also, since vibrations produced by the hard disk unit 1 are absorbed by the anti-vibration rubber pad 61, vibration of circuit board 4 and other components is also suppressed, thus improving the overall reliability of the IC card.

This embodiment relates to a circuit board 4 inside an IC card, and a hard disk unit 1 mounted thereon. As with the fourth embodiment, however, the beneficial effects need not be confined to applications having a circuit board 4 in an IC card, but should be generally applicable to any hard disk unit mounted on any circuit board.

What is claimed is:

1. An IC card with an on-board hard disk unit comprising:

a frame;

a circuit board having first and second surfaces, said circuit board being arranged within and supported by said frame;

a hard disk unit mounted on the first surface of said circuit board; and a metal front panel attached to said frame and covering the first surface of said circuit board and said hard disk unit, said metal front panel including a first portion where said IC card is relatively thin and a second, bulging portion where said IC card is relatively thick, the bulging portion accommodating said hard disk unit.

2. The IC card with an on-board hard disk of claim 1, wherein said front panel includes at least one vent.

3. The IC card with an on-board hard disk of claim 1, wherein said front panel is a mesh.

4. The IC card with an on-board hard disk of claim 1, wherein said hard disk unit is a hard disk unit that has a metal plate attached to part of its surface.

5. The IC card with an on-board hard disk of claim 1, wherein said hard disk unit is attached to said circuit board through a resilient body sandwiched between said hard disk unit and said circuit board.

* * * * *